United States Patent [19]

Spellmann

[11] Patent Number: 4,464,719

[45] Date of Patent: Aug. 7, 1984

[54] OFF-LINE METHOD OF DEPICTING PIPING ITEMS OF PIPE SPECIFICATION FILES OF A COMPUTER-AIDED GRAPHICS SYSTEM, WITHOUT DUPLICATIONS OCCURRING

[75] Inventor: Richard A. Spellmann, El Cerrito, Calif.

[73] Assignee: Chevron Research Company, San Francisco, Calif.

[21] Appl. No.: 358,063

[22] Filed: Mar. 15, 1982

Related U.S. Application Data

[63] Continuation of Ser. No. 108,266, Dec. 28, 1979, abandoned.

[51] Int. Cl.³ ............................................. G06F 15/56
[52] U.S. Cl. .................................................. 364/300
[58] Field of Search ... 364/200 MS File, 900 MS File, 364/512

[56] References Cited

U.S. PATENT DOCUMENTS

| | | | |
|---|---|---|---|
| 3,181,124 | 4/1965 | Hammel | 364/200 |
| 4,064,489 | 12/1977 | Babb | 364/200 |
| 4,181,954 | 1/1980 | Rosenthal et al. | 364/512 |

*Primary Examiner*—Felix D. Gruber
*Assistant Examiner*—John G. Mills
*Attorney, Agent, or Firm*—Harold D. Messner; Edward J. Keeling

[57] ABSTRACT

A present invention relates to a method of depicting piping items of a pipe specification file of a computer-dominated piping graphics system, off-line, irrespective of piping class and without duplication. Interactive report generation increases likelihood of effective batch operations.

6 Claims, 6 Drawing Figures

FIG_3a

FIG_3b

FIG_3c

| SIZE INCH | ITEM NO | SEL. CODE | DESCRIPTION | NOTE NOS. |
|---|---|---|---|---|
| | | | PIPE | |
| 3/8-1.5 | L11GA1A | | PIPE SMLS SCH 80 CS PE | |
| 2-6 | L11EA2A | | PIPE SMLS SCH 40 CS BFW | |
| 8-20 | L11CA2A | | PIPE SMLS SCH 20 CS BFW | |
| 22-22 | L11BA2A | | PIPE SMLS SCH 10 CS BFW | |
| 24-24 | L11UA2A | | PIPE SMLS .312W CS BFW | 13,18 |
| | | | BLOCK VALVES | |
| 3/8-1.5 | L20KAOHE | 1 | GATE VLV 800LB CS SCRD 12CR RP | |
| | L24JA0B8 | 4 | PLUG VALVE 600 LB CS SCRD REG | |
| | L25J80G8 | 5 | BALL VALVE 600 LB CS SCD ORBT FP | |
| 2-6 | L24BA3G8 | 4 | PLUG VLV 150LB CS RF SHORT HYPRE | |
| | L25B83F8 | 5 | BALL VLV 150LB CS RF ORBIT REG P | |
| 2-10 | L20BA3CA | 1 | GATE VALVE 150LB CS RF 12CR TR | |
| 8-12 | L24BA3GBM | 4 | PLUG VLV 150LB CS RF SHT HYPR GO | |
| 12-24 | L20BA3CA* | 1 | GATE VLV150LB CS RF 12CR GO-N | |
| | | | THROTTLE VALVES | |
| 1/2-1.5 | L21JA0DF | 2 | GLOBE VLV 800LB CS SCRD 12CR TR | |
| | L23JA0DF | 205 | ANGLE VLV 800LB CS SCRD 12CR TR | |
| 2-6 | L21BA3DA | 2 | GLOBE VLV 150LB CS RF 12CR TR | |
| | | | OTHER VALVES | |
| 1/2-1.5 | L22JA0RAF | 3 | CHECK VLV 800LB CS SCRD 12CR LFT | |
| 3/4-8 | J30FA3AA | 31 | CTL VLV GLOBE 1/8 300 CS RF P/B | |
| 2-16 | L22BA3PA | 3 | CHECK VLV 150LB CS RF SWING CR | |
| | | | FLANGES, JOINTS | |
| 3/4-1.5 | L33BBA | 1 | UNION 3000LB CS SCRD | 6 |
| 3/4-12 | L46BA3E | 10 | BLIND 150LB CS RF SPECTACLE | |
| 3/4-24 | L40BA2D* | 3 | FLANGE 150LB CS PF WN SCH | 12 |
| | L40BA3D* | 2 | FLANGE 150LB CS RF WN SCH | |
| | L40FA2D* | 4 | FLANGE 300LB CS PF WN SCH | |
| | L40FA3D* | 5 | FLANGE 300LB CS RF WN SCH | |
| 1-10 | L42FA3D* | 9 | ORIF FLGS 300LB CS RF WN SCH | 24 |
| 1.5-24 | L40BA2C | 6 | FLANGE 150LB CS PF SLIP-ON | 5 |
| | L40BA3C | 7 | FLANGE 150LB CS RF SLIP-ON | |
| 14-24 | L46BA3F | 11 | BLIND 150LB CS RF SPACER | |
| | L46BA3G | 12 | BLIND 150LB CS RF PLATE | |

| SIZE INCH | ITEM NO | SEL. CODE | DESCRIPTION | NOTE NOS. |
|---|---|---|---|---|
| | | | ELBOWS, BENDS | |
| 3/8-1.5 | L30BBAA | 3 | ELBOW 3000LB CS SCRD 45-DEG | |
| | L30BBAB | 1 | ELBOW 3000LB CS SCRD 90-DEG | |
| 2-6 | L50MA1AC | 3 | ELBOW STD WT CS BW 45-DEG LR | |
| | L50MA1BC | 1 | ELBOW STD WT CS BW 90-DEG LR | |
| | L50MA1BD | 2 | ELBOW STD WT CS BW 90-DEG SR | |
| 2-24 | L50MA1D | 4 | RED ELL STD WT CS BW 90-DEG LR | |
| 8-12 | L50CA1AC | 3 | ELBOW SCH 20 CS BW 45-DEG LR | |
| | L50CA1BC | 1 | ELBOW SCH 20 CS BW 90-DEG LR | |
| | L50CA1BD | 2 | ELBOW SCH 20 CS BW 90-DEG SR | |
| 14-24 | L50MA1AC | 3 | ELBOW STD WT CS BW 45-DEG LR | |
| | L50MA1BC | 1 | ELBOW STD WT CS BW 90-DEG LR | |
| | L50MA1BD | 2 | ELBOW STD WT CS BW 90-DEG SR | |
| | | | JUNCTIONS, BRANCH REINFORCEMENT | |
| 3/8-1.25 | L31BBAD | 2 | TEE 3000 LB CS SCRD REDUCING | |
| 3/8-1.5 | L31BBA | 1 | TEE 3000LB CS SCRD | |
| | L36BBAT | 6 | THREDOLET 3000LB CS SCRD | |
| | L36BBAU | 9 | ELBOLET 3000LB CS SCRD | |
| | L36BBAV | 8 | LATROLET 3000LB CS SCRD | |
| | L36VBAS | 4 | BOSS 6000LB CS SCRD | |
| 2-6 | L56MA1H | 5 | WELDOLET STD WT CS BW | |
| 8-24 | L56DA1L | 3 | SADDLE CS WELD | |
| | | | CONNECTORS, REDUCERS | |
| 3/8-1.5 | L34GABJ | 10 | NIPPLE SCH 80 CS TBE | |
| | L34BBAH | 9 | COUPLING 3000LB CS SCRD | |
| | L36GBBO | 2 | SWAGE NIPPLE SCH 80 CS TBE | |
| | L35GBHQ | 1 | SWAGE NIPPLE S80 CS BLE/TSE CON | |
| | L35BBAD | 4 | REDUCER 3000LB CS SCRD | |
| | L55NA1DA | 3 | REDUCER XS CS BW CONC | |
| 2-6 | L55MA1DA | 1 | REDUCER STD WT CS BW CONC | |
| | L55MA1DB | 401 | REDUCER STD WT CS BW ECC | |
| 8-24 | L55CA1DA | 1 | REDUCER SCH 20 CS BW CONC | |
| | L55CA1DB | 401 | REDUCER SCH 20 CS BW ECC | |
| | | | ENDS | |
| 3/8-1.5 | L37BBAX | 2 | CAP 3000LB CS SCRD | |
| | L37DABW | 1 | PLUG CS SCRD | |
| 3/4-24 | L43BA2 | 4 | BLIND FLG 150LB CS PF | |
| | L43BA3 | 3 | BLIND FLG 150LB CS RF | |
| 2-6 | L57MA1R | 1 | CAP STD WT CS BW | |
| 8-24 | L57CA1R | 1 | CAP SCH 20 CS BW | |
| | | | BOLTS AND GASKETS | |
| 3/4-24 | L61BTA | 1 | GASKET 150LB ASB COMP RF RING | |
| | L61BTB | 2 | GASKET 150LB ASB COMP FF RING | 12 |
| | L61FTA | 3 | GASKET 300LB ASB COMP RF RING | |
| | L62DAN | 10 | MACH BOLT MILD STL W/NUT | |
| | L62DBM | 20 | STUD BOLT B-7 W/2 NUTS | |

NOTES

1. REINFORCE BRANCH CONNECTIONS PER TABLE B, SHEET 2. CALCULATE NEED FOR REINFORCEMENT FOR (A) SIZES 26-IN. + LARGER + (B) INTERSECTIONS OTHER THAN 90 DEGREES.
2. USE TABLE B FOR CHANGES OF DIRECTION.
3. GEAR OPERATORS ARE REQUIRED ON VALVES 12-IN. + LARGER.
4. ALL TEMPERATURE CONNECTIONS SHALL BE SCREWED. ALL PRESSURE CONNECTIONS SHALL BE SCREWED. A
5. WELD NECK FLANGES ARE PREFERRED.
6. UNIONS ARE ALLOWED IF REMOVAL WILL NOT CAUSE INTERRUPTION OF PLANT OPERATIONS.
7. PIPE SPOOLS 3 IN. AND LARGER WILL NORMALLY BE SHOP FABRICATED EXCEPT FOR WELDEND VALVES.
8. SIZE RANGE SHOWN FOR REDUCERS IS FOR SMALL END.
9. FOR EXTERNAL COATING ON BURIED LINES, ADD ONE OF THE FOLLOWING LETTERS AS THE 8TH DIGIT OF THE ITEM NUMBER COVERING THE PIPE. B=SOMASTIC, C=P2A WRAP, F=X-TRU-COAT. FOR X-TRU-COAT, ORDER THERMOFIT SLEEVES ITEM L78A09.
10. WELDS SHALL BE RANDOM RADIOGRAPHED IN ACCORDANCE WITH SPECIFICATION EG-2905.
11. USE MILD STEEL MACHINE BOLTS WHEN BOLTING AGAINST CAST IRON FLANGES.
12. USE 150LB USAS STEEL PLAIN FACED FLANGES + ASBESTOS COMPOSITION FULL FACE GASKETS AGAINST CAST IRON FLANGES.
13. ELECTRIC FUSION WELDED PIPE UNDER SPEC. A155, GRADE C55 MAY BE SUBSTITUTED FOR SEAMLESS PIPE FOR USE OUTSIDE PROCESS UNITS, WITH SPECIFIC COMPANY APPROVAL.
15. LIMITATION FOR PLUG VALVES L24JA0B8, L24BA3G8, L24BA3GBM=360F.
16. REFER TO ENGR. DEPT. DWG. GE-L34406 FOR LINE-UP AND BACK BEVELING REQUIREMENTS.
18. *-DENOTES INCOMPLETE ITEM NUMBER. EXACT ITEM DEPENDS ON SPECIFIC INSTALLATION.
22. LIMITED SEAL WELDING – SEE SHEET 1 FOR REQUIREMENTS.
24. USE WELD NECK FLANGES + THROAT TAPS FOR 12-IN. + LARGER.
33. SWAGED NIPPLE PREFERRED.

SERVICES – LOW PRESSURE GENERAL SERVICES TO 450F MAXIMUM, AND STEAM TO 165 PSIG (NOT FOR STEAM SERVICE WITHIN THE SCOPE OF SECTION 1 OF POWER BOILER CODE)

LIMITATIONS –
100F - 275 PSIG   300F - 210 PSIG
150F - 255 PSIG   350F - 195 PSIG
200F - 240 PSIG   400F - 180 PSIG
250F - 225 PSIG   450F - 165 PSIG
150LB USAS FLANGES LIMIT PRESSURE
1/16-IN. ASBESTOS COMPOSITION RING GASKETS LIMIT TEMPERATURE
CORROSION ALLOWANCE = 1/16-IN.
(EXCEPT 24-IN. AT 100F = 0.054-IN.)

INDIVIDUAL PIPING CLASSIFICATION

FIG_4

OFF-LINE METHOD OF DEPICTING PIPING ITEMS OF PIPE SPECIFICATION FILES OF A COMPUTER-AIDED GRAPHICS SYSTEM, WITHOUT DUPLICATIONS OCCURRING

This is a continuation of application Ser. No. 108,266, filed Dec. 28, 1979 and now abandoned.

FIELD OF THE INVENTION

This relates to an improved method of providing isometric drawings of piping systems (and generating associated bills of material), both used in construction within an oil refinery, chemical plant, and the like.

RELATED APPLICATIONS

The following application assigned to the assignee of the instant application is hereby incorporated by reference: Ser. No. 412,527 filed Nov. 2, 1973 for "Computer-aided Graphics System Including a Computerized Material Control System and Method of Using Same", L. Rosenthal et al, now Pat. No. 4,181,954, issued Jan. 1, 1980.

BACKGROUND OF THE INVENTION

While the above-identified piping system dominates the market place related to automatic generation of isometric drawings and associated bills of materials in large-scale piping projects, improvements are always sought. E.g., within each piping specification file the same piping item—by material number—is set forth in several different piping classes. Result: the duplication of the items can unduly complicate the task of a project leader, especially during the initial phases of his project.

SUMMARY OF THE INVENTION

The present invention relates to a novel off-line method by which each updated pipe specification record is scanned, by classes, to extract all material item numbers contained in their fields. Then after duplications of the same item number have been identified and eliminated, a material item ordering description report is generated of all unduplicated items. Result: the user has a "quick-look" overview of the project in accordance with the piping items to be used.

DETAILED DESCRIPTION OF THE DRAWINGS

FIGS. 3a-3e are a flow chart of programmable method of FIG. 2; and

FIG. 4 illustrates the make-up of an individual pipe specification file.

DESCRIPTION OF AN EMBODIMENT OF THE PRESENT INVENTION

Figure 1:
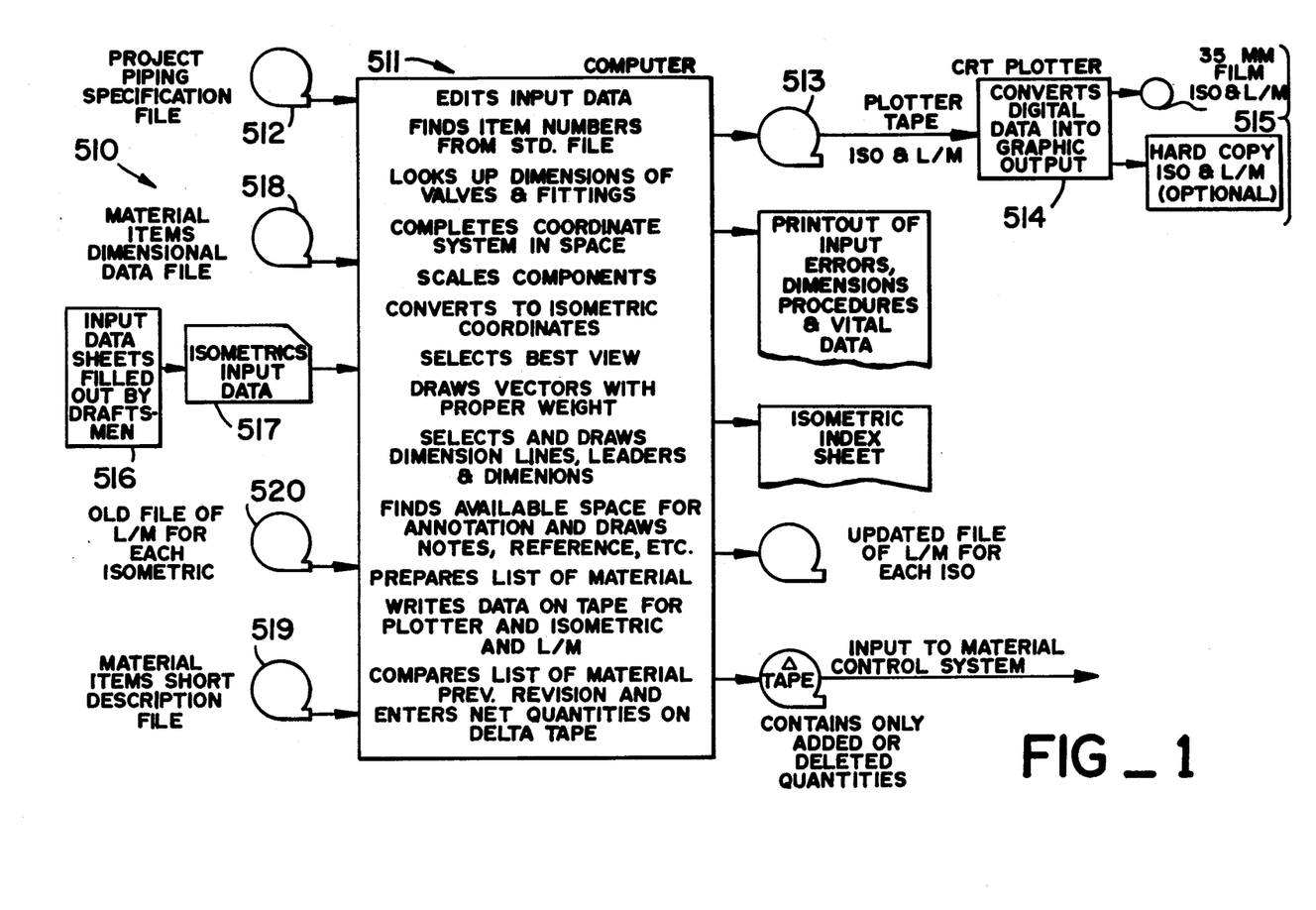
FIG. 1 is a schematic diagram illustrating operations of an isometric and materials listing system in which an offline programmable method for depicting piping items is used.

Refer now to FIG. 1, illustrating a computer-aided graphics system 510 in operation. The depicted computer-aided graphics system 510 provides an easy-to-understand input and output coding system as described, op. cit., capable of being used by a competent piping draftsman. Suffice it to say, that system 510 includes a computer 511, properly programmed to act on data in a preselected manner. That is to say, computer 511 is typically a large general purpose computer such as an IBM 7094 or IBM 360/65 having a central processor, a large high-speed memory and an input-output device or devices controlled by a central controller. Through operation of the computer 511, control signals are generated for manipulating the input data including project piping specification file 512.

It should be recalled that the computer 511 can be programmed to control operations in several ways: by specifically authorizing certain operations; by calls for input or output functions; by alternating flows of controls so that groups of statements can then be excited repeatedly or the sequence otherwise changed; as well as the insertion of certain statements which provide information without requiring further computation. As changes in the data occur to accumulation of results within the computer the output devices can be controlled to provide a magnetic tape 513 onto which have been read plotting signals for use in conjunction with a well-known CRT plotter 514 such as an SC-4060 CRT plotter to produce an isometric drawing 515.

In executing the program or programs in the computer memory, digital words—say a 32-bit word—are accessed from the memory and temporarily stored in the central processor. There, the operational code and arguments are interpreted and the appropriate action (such as add, shift, accumulate, load, store, control, print, etc.) is performed. As a result, sequence of data arrays is generated within the central processor and provide all information needed to display the three-dimensional pipeline as a planar representation at plotter 514. That is, a series of display command signals can be generated which can be recorded on the magnetic tape 513 for later loading into the plotter 514. The plotter 514 is a cathode ray device such as an SC-4020 or SC-4060 (Stromberg Datagraphics) or FR-80 (Information International). These devices convert the polotting tape data signals into lines and letters and record the information into microfilm at high speed. Two frames of information that make up each isometric drawing are completed every two seconds. The visual transfer to a complete engineering drawing is an enlargement on paper vellum of the two film frames. The left-hand frame, for example, portrays the actual isometric drawing with a list of materials, notes and references; and data and titles contained in the right-hand frame. The exact size of the drawing depends on a number of different factors including the make of the plotting device and the type of film, either 16 or 35 mm. film.

CODES

In reliance upon the analogy that control logic can be most appropriately illustrated from the input, output and intermediate data character, a detailed discussion of the data structure is set forth in FIG. 1, whereby overall cooperation of card and tape input data to the computer 511 is shown.

As shown, from user initiated data via data sheet 516, punched cards 517 can be provided. At processing time, the computer 511 can be loaded with associated inputs via magnetic tape, to wit: magnetic tape 518 related to dimensional data of the piping items; magnetic tape 519 related to a short description data file useful in providing easy-to-understand symbols for the final display; magnetic tape 520 utilized to input the "old" list of materials for each isometric so that as changes are made, the "new" list of materials can reflect these changes; and/or the magnetic tape 512 containing data fields related to individual piping items of the present invention, as discussed above and below in detail. All the above data bases are placed in memory within the computer 511, then fetched and manipulated by the control processor as needed to provide the desired function.

Since the piping specification file 512 is for the exclusive use of the user, appropriate instructional notes to aid in the correct selection of piping items in view of service conditions of the piping system are optionally available, as explained below. Upon presentation by the user-designer of the correct code, the required piping item of the specfication file is specified in terms of the correct usage of the item within the pipeline system. The piping specification file 512 is unique for each project containing specific material selections and design instructions for the plans being designed, with the file being used by the computer to provide the intelligence for selection of appropriate piping items from a coded input by the designer. It also provides title information for the isometric drawing blocks, as well as provides information for branching reinforcement, change in directions (elbows, miters, and so forth), valve temperature limitations and groupings of materials for shop fabrication, or field erection.

FIG. 4 illustrates a printout of an individual piping file for a particular piping class. With regard to the latter, recall that there can be similar piping data within the different piping classes of each file since the pipe classes only reflect for piping items broad categories for use related to type of service, temperature, and pressure conditions allowed for, etc.

As shown, the data of FIG. 4 is arranged in rows and columns. The rows along the left-hand side, are based upon the size of the pipe. The second column establishes an item number in alphanumeric format. The third column specifies a selection code to be utilized in the selection of individual fittings and valves. The fourth column specifies the description of the particular item number, and in printing out such a designation the short description file of FIG. 1 is utilized. The fifth column specified notes of interest.

Since each pipe specification file 512 is constantly being updated, a description of the method of creating such a file and cross-checking data is instructive.

Figure 2:
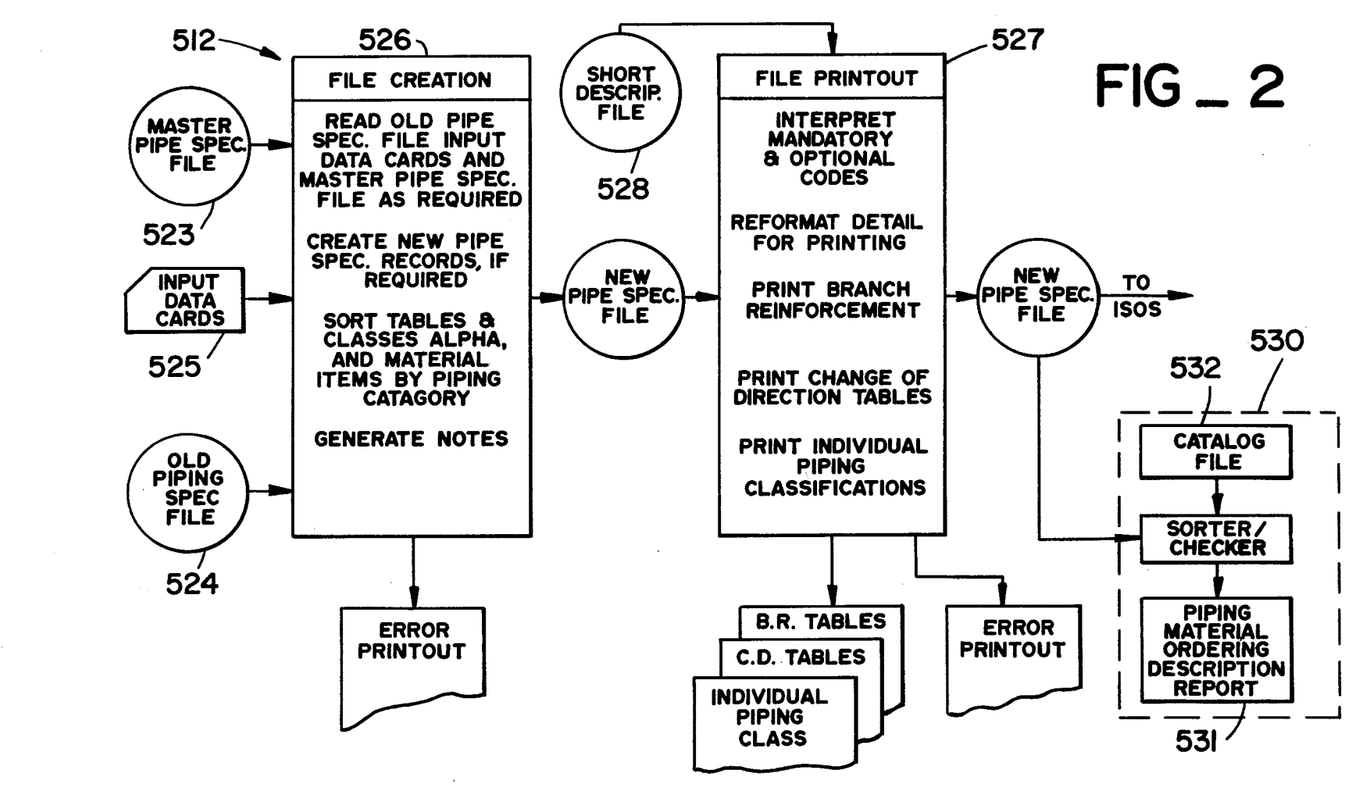
FIG. 2 is a block diagram illustrating how piping items within pipe specification files can be depicted in accordance with the method of the present invention.

As shown in FIG. 2, a piping specification file 512 can be created from a number of sources. For example, a master piping specification file 523 depicted as a magnetic tape, can be used. Similarly, an old piping specification file 524 can also be used, which is more up-to-date and more in line with the present object such as symbolized by magnetic tape input marked 524. Or, a complete input data card can be created as illustrated by card symbol 525. Within the computer, a file is created symbolized by block 526 in which various sort tables and decisional tables can be created by piping categories. Similarly, notes can be generated of a particular nature. File printouts 527 are accomplished using a printer after the new piping specification file has been inputted thereto in parallel with a short description file 528.

Assume the information has been inputted via the various sources indicated above; in order to depict material items without duplication, off-line programmable method 530 of the present invention is utilized, whereby such items are indicated by catalog description in a report 531 through cross-scanning of catalog file 532.

Figure 3A:
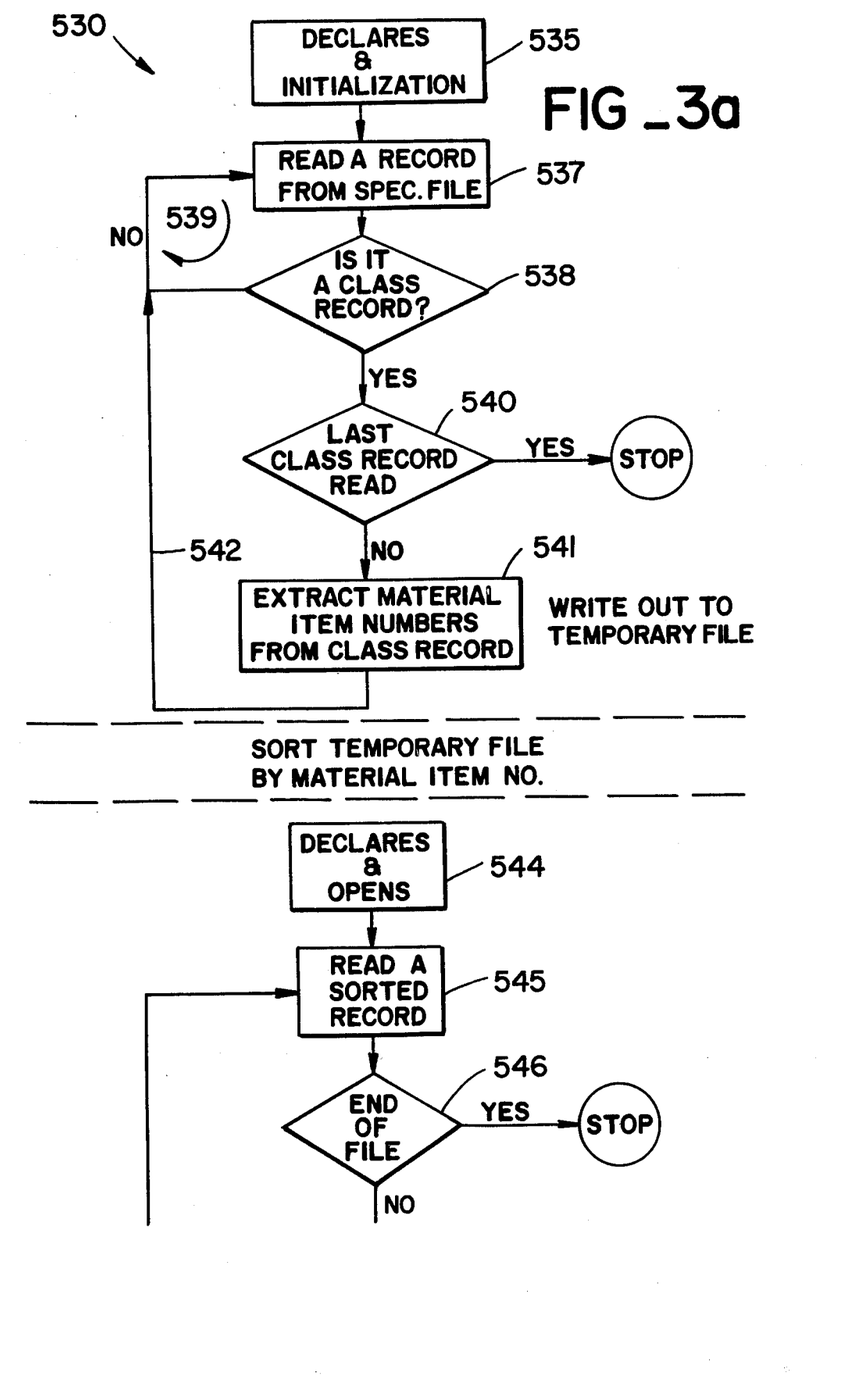
Figure 3B:
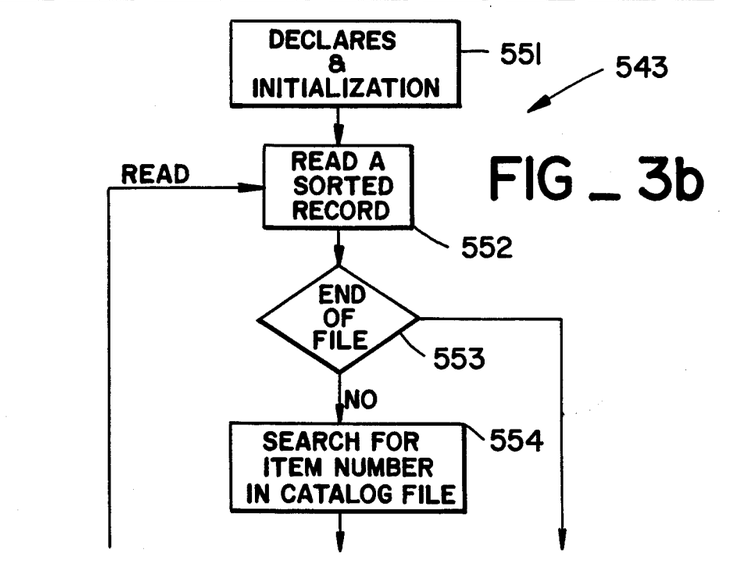
Figure 3C:
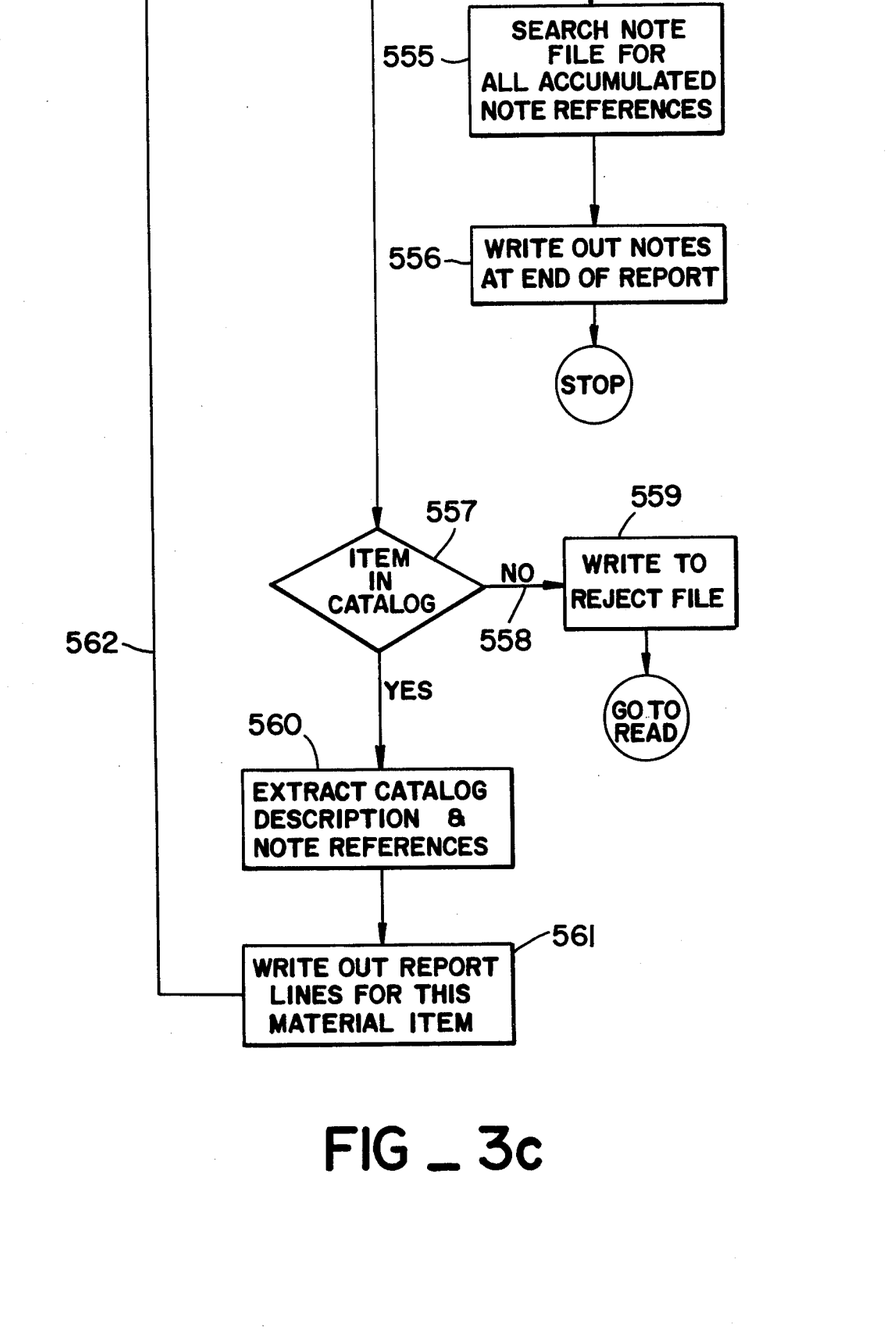

FIG. 3 illustrates steps provided by the programmed method 530 of the present invention.

Briefly, the method 530 is used off-line, in interactive form using a terminal connected to a remote computer rather in batch mode in conjunction with system computer 511 of FIG. 1. In that way, process utilization time can be maximized.

As shown in FIG. 3, after declaration and utilization steps have occurred at 535 a record is read, at 537. At 538, a determination is made to determine if the record read was a class record. If not, loop 539 is entered and a new record is read. If the record is a class record, then (after passing through "last record" step 540) the material item number from the class record is extracted at 541, where (i) the data is written out to a temporary file; and (ii) iteration loop 542 is entered and a new record is interrogated.

Next, the extracted material item numbers (on file temporarily), are scanned and duplications identified and eliminated. More particularly, after declaration and file opening steps have occurred at 544, the sorted record is read, at 545. After decisional steps at 546, 547, and 548, have occurred, the non-duplicated material item data are written out to the next program phase, generally indicated at 550. Note that any item suffixed by an asterisk has had the latter replaced via loop 549.

Within next phase 543, the programmed method of the present invention provides for a printed report of all material items by catalog description irrespective of class and without duplication. As shown, after declaration and initialization steps have occurred at 551, the sorted record is read, at 552. If the record is the end of the file, a decisional step at 553 causes loop 554 to be entered where a note file 555 is searched and a write-out step of the located notes occurs at 556.

Otherwise, the searched item numbers are crossindexed to a full descriptions file at 557. At 557, a determination is made as to whether or not the item number can be cross-indexed to the catalog description. If it cannot, loop 558 is entered, and the item is written out as a rejected item at 559. If item is cross-indexable, the description is extracted at 560 and written out at 561. Iteration loop 562 is then entered and the process repeated for a new record.

The present invention has been successfully implemented and the program listing thereof is set forth below. While an embodiment and listing have been set forth in detail, variations are readily apparent to those skilled in the art, and the invention is to be given its broadest interpretation within the purview of the following claims.

```
C                                                                   CAP00010
C        EXTRACTS ITEM NUMBERS FROM CLASS TABLES OF SPEC FILE       CAP00020
C        PROJECT 205                                                CAP00030
C                                                                   CAP00040
C                                                                   CAP00050
      INTEGER *4 NOBR,NOCOD,NOHOT,NOCOLD,NOVD,ZERO/0/,ITEMNO(3),    CAP00060
     M            WRDCNT,NOSUB,COLCNT,SKIP,NOCLS,DUMMY,WRKORD,SBREC(581),CAP00070
     M            DUM(39),TITLE(26)                                 CAP00080
      SKIP=0                                                        CAP00090
C                                                                   CAP00100
C     READ FIRST RECORD AND EXTRACT WORK ORDER NUMBER               CAP00110
C                                                                   CAP00120
      READ (21)WRKORD                                               CAP00130
      WRITE (95,9) WRKORD                                           CAP00140
    9 FORMAT(I4)                                                    CAP00150
C                                                                   CAP00160
C       READ SECOND RECORD AND EXTRACT NUMBER OF CLASSIFICATIONS    CAP00170
C                                                                   CAP00180
      READ(21)NOCLS                                                 CAP00190
C                                                                   CAP00200
C     READ THIRD RECORD AND EXTRACT NOBR,NOCOD,NOHOT,NOCOLD & NOVD  CAP00210
C                                                                   CAP00220
      READ (21) DUMMY,NOBR,NOCOD,NOHOT,NOCOLD,NOVD                  CAP00230
C                                                                   CAP00240
C       COMPUTE TOTAL NUMBER OF RECORDS TO SKIP TO GET TO CLASS TABLE CAP00250
C                                                                   CAP00260
      IF  (NOBR.NE.ZERO) SKIP = SKIP + 1                            CAP00270
      IF (NOCOD.NE.ZERO) SKIP = SKIP + 1                            CAP00280
      IF (NOHOT.NE.ZERO) SKIP = SKIP + 1                            CAP00290
      IF(NOCOLD.NE.ZERO) SKIP = SKIP + 1                            CAP00300
      IF  (NOVD.NE.ZERO) SKIP = SKIP + 1                            CAP00310
      SKIP  = SKIP + NOBR+NOCOD+NOHOT+NOCOLD+NOVD                   CAP00320
C                                                                   CAP00330
C       EXTRACT TITLE FROM TITLE RECORD AND WRITE TO AN EXTERNAL    CAP00340
C       FILE.  TITLE RECORD IS RECORD NUMBER FOUR.                  CAP00350
C                                                                   CAP00360
      READ(21) ((DUM(J),J=1,39),(TITLE(K),K=1,26))                  CAP00370
      WRITE(94,10) (TITLE(K),K=1,13)                                CAP00380
      WRITE(94,10) (TITLE(K),K=14,26)                               CAP00390
   10 FORMAT(13A4)                                                  CAP00400
C                                                                   CAP00410
C       SKIP DOWN TO THE CLASS TABLE                                CAP00420
C                                                                   CAP00430
      DO 201 K=1,SKIP                                               CAP00440
         READ(21) DUMMY                                             CAP00450
  201 CONTINUE                                                      CAP00460
C                                                                   CAP00470
C     MASTER LOOP THAT EXTRACTS ITEM NUMBERS FORM CLASS TABLE       CAP00480
C         FIRST RECORD - SKIPPED                                    CAP00490
C         SECOND RECORD - 10 WORD SUBRECORDS                        CAP00500
C         3RD-9TH RECORD -  9 WORD SUBRECORDS                       CAP00510
C     10TH&11TH RECORD - SKIPPED                                    CAP00520
C                                                                   CAP00530
      DO 501 K=1,NOCLS                                              CAP00540
         READ (21) DUMMY                                            CAP00550

C                                                                   CAP00560
C           WORK WITH SECOND RECORD - 10 WORD SUBRECORD             CAP00570
C                                                                   CAP00580
         READ(21)(WRDCNT,(SBREC(J),J=1,WRDCNT))                     CAP00590
         NOSUB=WRDCNT/10                                            CAP00600
         DO 421 J=1,NOSUB                                           CAP00610
            DO 411 I=1,3                                            CAP00620
               COLCNT=3+I+(J-1)*10                                  CAP00630
               ITEMNO(I)=SBREC(COLCNT)                              CAP00640
  411       CONTINUE                                                CAP00650
            WRITE(85,11) (ITEMNO(I),I=1,3)                          CAP00660
   11       FORMAT(3(A4))                                           CAP00670
  421    CONTINUE                                                   CAP00680
C                                                                   CAP00690
C           WORK WITH RECORDS 3-9 OF CLASS TABLE                    CAP00700
C                                                                   CAP00710
```

```
            DO 481 J=1,7                                              CAP00720
               READ(21) (WRDCNT,(SBREC(J1),J1=1,WRDCNT))              CAP00730
               NOSUB=WRDCNT/9                                         CAP00740
               DO 451 I=1,NOSUB                                       CAP00750
                  DO 441 N=1,3                                        CAP00760
                     COLCNT=3+N+(I-1)*9                               CAP00770
                     ITEMNO(N)=SBREC(COLCNT)                          CAP00780
      441         CONTINUE                                            CAP00790
                  WRITE(85,12)(ITEMNO(I2),I2=1,3)                     CAP00800
       12         FORMAT(3(A4))                                       CAP00810
      451      CONTINUE                                               CAP00820
      481   CONTINUE                                                  CAP00830
C                                                                     CAP00840
C     SKIP 10TH AND 11TH RECORDS                                      CAP00850
C                                                                     CAP00860
            READ(21)DUMMY                                             CAP00870
            READ(21)DUMMY                                             CAP00880
      501 CONTINUE                                                    CAP00890
          STOP                                                        CAP00900
          END                                                         CAP00910

/*****                                                                BYD00010
    DELETES DUPLICATES IN FILE WITH SORTED ITEM NUMBERS               BYD00020
    PROJECT 205                                                       BYD00030
    CAPIM                                                             BYD00040
 *****/                                                               BYD00050
 BYDUP: PROC OPTIONS(MAIN );                                          BYD00060
 DECLARE HOLDIT CHAR(12) INIT(''),                                    BYD00070
         ITEM CHAR (12),                                              BYD00080
            1 STAR_ITEM,                                              BYD00090
               2 NONE CHAR(5),                                        BYD00100
               2 STARS (4) CHAR(1),                                   BYD00110
           NOBLK CHAR (9) DEFINED STAR_ITEM,                          BYD00120
            SUBSTR BUILTIN,                                           BYD00130
            TRUE BIT(1) INIT('1'B),                                   BYD00140
            ITEMFL FILE INPUT RECORD,                                 BYD00150
            SORTD FILE OUTPUT RECORD;                                 BYD00160
 ON ENDFILE(ITEMFL) GO TO LAST;                                       BYD00170
 OPEN FILE(ITEMFL);                                                   BYD00180
 OPEN FILE(SORTD);                                                    BYD00190
 DO WHILE (TRUE);                                                     BYD00200
    READ FILE(ITEMFL) INTO(ITEM);                                     BYD00210
    IF ITEM -= HOLDIT                                                 BYD00220
       THEN DO;                                                       BYD00230
          NOBLK=(SUBSTR(ITEM,1,3) || SUBSTR(ITEM,5,6));               BYD00240
          DO K=1 TO 4;                                                BYD00250
             IF STARS(K)='*' THEN STARS(K) = ' ';                     BYD00260
          END;                                                        BYD00270
             WRITE FILE(SORTD) FROM(STAR_ITEM);                       BYD00280
             HOLDIT=ITEM;                                             BYD00290
       END;                                                           BYD00300
 END;                                                                 BYD00310
 LAST:                                                                BYD00320
 IF ITEM -= HOLDIT THEN WRITE FILE(SORTD) FROM(NOBLK);                BYD00330
 END;                                                                 BYD00340

CAPIM4D:                                                              00000010
  PROC OPTIONS (MAIN);                                                00000020
/**** REPORT WRITER OF PIPE DESCRIPTIONS PROJECT 205             ****/00000030
  DECLARE                                                             00000040
     ITEMNO FILE INPUT RECORD,                                        00000050
     CATALOG FILE INPUT RECORD,                                       00000060
     REPORT FILE OUTPUT RECORD ENV(F(81)CTLASA),                      00000070
     NOTES FILE INPUT RECORD,                                         00000080
     WORDOR FILE INPUT RECORD,                                        00000090
     REJECT FILE RECORD,                                              00000100
     PRJTTL FILE INPUT RECORD;                                        00000110
DCL  SEARCH CHAR(9) INIT(''),                                         00000120
     WRNO CHAR(4) INIT(''),                                           00000130
     PGNO FIXED DEC(3,0);                                             00000140
DCL 1 CAT_AREA,                                                       00000150
      2 FILL1 CHAR(10),                                               00000160
      2 NUMBER CHAR(9),                                               00000170
      2 FILL2 CHAR(11),                                               00000180
```

```
            2 DESC(7) CHAR(60),                                              00000190
            2 FILL3 CHAR(71) ,                                               00000200
        2 NOTE(4) CHAR(2),                                                   00000210
        2 FILL4 CHAR(41);                                                    00000220
DCL     1 TITLE1A,                                                           00000230
            2 FILL1 CHAR(14) INIT(''),                                       00000240
            2 PRO_NAM CHAR(52) INIT(''),                                     00000250
            2 FILL2 CHAR(15),                                                00000260
        1 TITLE1B LIKE TITLE1A,                                              00000270
        1 TITLE2,                                                            00000280
            2 FILL1 CHAR(33) INIT(''),                                       00000290
            2 LIT CHAR (12) INIT('WORK ORDER: '),                            00000300
            2 ONONO CHAR (4),                                                00000310
            2 FILL2 CHAR (32) INIT('');                                      00000320
DCL     1 TITLE3,                                                            00000330
            2 FILL1 CHAR (23) INIT(''),                                      00000340
        2 LIT CHAR (36) INIT ('PIPING MATERIAL ORDERING DESCRIPTION'),       00000350
        2 FILL2 CHAR(22) INIT('');                                           00000360
DCL     1 TITLE4,                                                            00000370
            2 FILL1 CHAR (61) INIT(''),                                      00000380
            2 LIT CHAR (5) INIT ('PAGE '),                                   00000390
            2 OPGNO PIC'ZZ9',                                                00000400
            2 FILL2 CHAR(12) INIT('');                                       00000410
DCL     1 CUT_AREA,                                                          00000420
            2 FILL1 CHAR(2) INIT(''),                                        00000430
            2 OITNO CHAR(9),                                                 00000440
            2 FILL2 CHAR(5) INIT(''),                                        00000450
            2 ODESC CHAR(60),                                                00000460
            2 FILL3 CHAR(5) INIT('');                                        00000470
1DCL    1 DTLINE,                                                            00000480
            2 FILL1 CHAR (68) INIT(''),                                      00000490
            2 DT1 CHAR(2),                                                   00000500
            2 FILL2 CHAR(1) INIT('/'),                                       00000510
            2 DT2 CHAR(2),                                                   00000520
            2 FILL3 CHAR (1) INIT('/'),                                      00000530
            2 DT3 CHAR (2),                                                  00000540
            2 FILL4 CHAR (5) INIT('');                                       00000550
DCL     1 TITLE_N,                                                           00000560
            2 FILL1 CHAR(32) INIT(''),                                       00000570
            2 LIT CHAR(17) INIT('NOTE REFERENCES'),                          00000580
            2 FILL2 CHAR(32) INIT('');                                       00000590
DCL     1 IN_NOTE,                                                           00000600
            2 TEMPNOTE CHAR (2),                                             00000610
            2 FILL1    CHAR(5),                                              00000620
            2 NDESC    CHAR(60);                                             00000630
DCL     1 NOTELINE,                                                          00000640
            2 FILL1 CHAR(9) INIT(''),                                        00000650
            2 ONOTE CHAR(2) INIT(''),                                        00000660
            2 FILL2 CHAR (5) INIT(''),                                       00000670
            2 ONDESC CHAR(60),                                               00000680
            2 FILL3 CHAR(5) INIT('');                                        00000690
DCL     1 TITLE_R,                                                           00000700
            2 FILL1 CHAR(22) INIT (''),                                      00000710
            2 LIT CHAR (37) INIT('ITEM NUMBERS NOT FOUND IN THE CATALOG'),   00000720
            2 FILL CHAR (22) INIT ('');                                      00000730
DCL     1 REJ_OUT,                                                           00000740
        2 FILL1 CHAR(1),                                                     00000750
        2 ITEM (8),                                                          00000760
            3 REJ_IT CHAR (9),                                               00000770
            3 FILL2 CHAR(1) INIT ('');                                       00000780
DCL     LASTNOTE FIXED DEC (3,0),                                            00000790
        DUP BIT(1) INIT('0'B),                                               00000800
        NCODE (700) CHAR(2) INIT(' '),                                       00000810
        SAVE CHAR(2),                                                        00000820
        TEMPCODE CHAR(2),                                                    00000830
        LAST_VAL CHAR(2) INIT(' '),                                          00000840
        ODATE CHAR(6),                                                       00000850
        DATE BUILTIN,                                                        00000860
        SUBSTR BUILTIN,                                                      00000870
        BLANK CHAR(81) INIT((81)' '),                                        00000880
        NEWPG CHAR (81) INIT('1    '),                                       00000890
        NOLINES FIXED DEC (4,0),                                             00000900
        END_FILE_FLG BIT(1) INIT('0'B),                                      00000910
        NEW_PG_FLG BIT(1) INIT('0'B),                                        00000920
        NO_READ_FLG BIT(1) INIT('0'B),                                       00000930
```

```
            TRUE BIT(1) INIT('1'B);                                 00000940
1      ON ENDFILE (ITEMNO)                                          00000950
            GOTO E_OF_IT;                                           00000960
        ON ENDFILE (CATALOG)                                        00000970
            GOTO ERR_CAT;                                           00000980
        ON ENDFILE (NOTES) GO TO E_OF_NOTES;                        00000990
         ON ENDFILE (REJECT) GO TO E_OF_REJ;                        00001000
0      OPEN FILE (ITEMNO);                                          00001010
       OPEN FILE (CATALOG);                                         00001020
       OPEN FILE (REPORT);                                          00001030
       OPEN FILE (WORDOR);                                          00001040
       OPEN FILE (PRJTTL);                                          00001050
         OPEN FILE (REJECT) OUTPUT;                                 00001060
0        PGNO=1;                                                    00001070
         OPGNO=PGNO;                                                00001080
   /*** INSERTS PROJECT TITLE INTO THE OUTPUT AREAS FOR THE HEADING 00001090
        LINES.  TITLE RETREIVED FROM SPEC FILE.     ***/            00001100
0        READ FILE (PRJTTL) INTO (TITLE1A.PRO_NAM);                 00001110
         READ FILE (PRJTTL) INTO (TITLE1B.PRO_NAM);                 00001120
0        READ FILE(WORDOR) INTO (WRNO);                             00001130
         WRITE FILE (REPORT) FROM (NEWPG);                          00001140
         WRITE FILE (REPORT) FROM (BLANK);                          00001150
         WRITE FILE (REPORT) FROM (TITLE1A);                        00001160
         WRITE FILE (REPORT) FROM (TITLE1B);                        00001170
         OWONO=WRNO;                                                00001180
         WRITE FILE (REPORT) FROM (TITLE2);                         00001190
         WRITE FILE (REPORT) FROM (TITLE3);                         00001200
         WRITE FILE (REPORT) FROM (TITLE4);                         00001210
         WRITE FILE (REPORT) FROM (BLANK);                          00001220
       READ FILE (ITEMNO) INTO (SEARCH);                            00001230
       READ FILE (CATALOG) INTO (CAT_AREA);                         00001240
      NOLINES=7;                                                    00001250
      LASTNOTE =0;                                                  00001260
    /** INITIALIZES NCODE ARRAY ***/                                00001270
       DO K=1 TO 700;                                               00001280
           NCODE(K)=' ';                                            00001290
       END;                                                         00001300
    /****   SET UP DATE INTO OUTPUT LINE   ****/                    00001310
              ODATE=DATE;                                           00001320
              DT1=SUBSTR(ODATE,3,2);                                00001330
              DT2=SUBSTR(ODATE,5,2);                                00001340
              DT3=SUBSTR(ODATE,1,2);                                00001350
1      DO WHILE (TRUE);                                             00001360
          DO WHILE(SEARCH ¬= NUMBER);                               00001370
           IF NO_READ_FLG= '0'B THEN                                00001380
              READ FILE (CATALOG) INTO (CAT_AREA);                  00001390
           ELSE NO_READ_FLG='0'B;                                   00001400
           IF NUMBER>SEARCH THEN DO;                                00001410
                          NO_READ_FLG='1'B;                         00001420
                          WRITE FILE (REJECT) FROM (SEARCH);        00001430
                          GO TO AN_IT;                              00001440
              END;                                                  00001450
         END;          /* END OF DO WHILE LOOP */                   00001460
0   /*** EXTRACTS NOTES FROM CATALOG RECORD  ***/                   00001470
0       DO K=1 TO 4;                                                00001480
             IF NOTE(K)  ¬='' THEN DO;                              00001490
               DO J=1 TO LASTNOTE;                                  00001500
                  IF NOTE(K) = NCODE(J) THEN DUP= '1'B;             00001510
               END;                                                 00001520
               IF DUP¬='1'B THEN DO;                                00001530
                    LASTNOTE=LASTNOTE+1;                            00001540
                    NCODE(LASTNOTE)=NOTE(K);                        00001550
               END;                                                 00001560
            END;                                                    00001570
         DUP='0'B;                                                  00001580
         END;                                                       00001590
0   /*** SETS UP & OUTPUTS THE DESCRIPTIONS ***/                    00001600
0         OITNO=SEARCH;                                             00001610
          ODESC=DESC(1);                                            00001620
          DO K=1 TO 7;                                              00001630
             IF DESC(K)='' THEN GO TO FOUND;                        00001640
          END;                                                      00001650
FOUND:                                                              00001660
       IF NOLINES + K >= 54 THEN DO;                                00001670
              WRITE FILE (REPORT) FROM (DTLINE);                    00001680
```

```
                    WRITE FILE (REPORT) FROM (NEWPG);               00001690
                    PGNO=PGNO+1;                                     00001700
                    OPGNO=PGNO;                                      00001710
                    WRITE FILE (REPORT) FROM (BLANK);                00001720
                    WRITE FILE (REPORT) FROM (TITLE1A);              00001730
                    WRITE FILE (REPORT) FROM (TITLE1B);              00001740
                    WRITE FILE (REPORT) FROM (TITLE2);               00001750
                    WRITE FILE (REPORT) FROM (TITLE3);               00001760
                    WRITE FILE (REPORT) FROM (TITLE4);               00001770
                    WRITE FILE (REPORT) FROM (BLANK);                00001780
                    NOLINES = 7;                                     00001790
            END;                                                     00001800
                WRITE FILE (REPORT) FROM (OUT_AREA);                 00001810
                  NOLINES=NOLINES+1;                                 00001820
                  OITNO='';                                          00001830
                DO J=2 TO K;                                         00001840
                    ODESC=DESC(J);                                   00001850
                    WRITE FILE (REPORT) FROM (OUT_AREA);             00001860
                  NOLINES=NOLINES+1;                                 00001870
                END;                                                 00001880
                WRITE FILE (REPORT) FROM (BLANK);                    00001890
                NOLINES=NOLINES+1;                                   00001900
        AN_IT:                                                       00001910
                READ FILE (ITEMNO) INTO (SEARCH);                    00001920
            END;        /*** END OF MAJOR DO WHILE LOOP ***/         00001930
        ERR_CAT:                                                     00001940
            ODESC='';                                                00001950
             ODESC=' ERROR - END OF CATALOG';                        00001960
            OITNO=SEARCH;                                            00001970
            WRITE FILE (REPORT) FROM (OUT_AREA);                     00001980
             WRITE FILE (REJECT) FROM (SEARCH);                      00001990
             DO WHILE (TRUE);                                        00002000
                READ FILE (ITEMNO) INTO (SEARCH);                    00002010
                WRITE FILE (REJECT) FROM (SEARCH);                   00002020
            END;                                                     00002030
        E_OF_IT:                                                     00002040
            IF LASTNOTE=0 THEN DO;                                   00002050
                    OITNO='';                                        00002060
                    ODESC=' NO NOTES FOR THIS REPORT ';              00002070
                    WRITE FILE (REPORT) FROM (BLANK);                00002080
                    WRITE FILE (REPORT) FROM (OUT_AREA);             00002090
                    WRITE FILE (REPORT) FROM (BLANK);                00002100
                    WRITE FILE (REPORT) FROM (DTLINE);               00002110
                    GOTO OUT_REJ;                                    00002120
            END;                                                     00002130
            WRITE FILE (REPORT) FROM (DTLINE);                       00002140
1/*****  OUTPUT OF NOTES ***/                                        00002150
0   /* FIRST SORT THE NOTES */                                       00002160
0   DO K=1 TO LASTNOTE - 1;                                          00002170
        IF NCODE(K)>NCODE(K+1) THEN DO;                              00002180
            TEMPCODE=NCODE(K+1);                                     00002190
            NCODE(K+1) = NCODE(K);                                   00002200
            NCODE(K) = TEMPCODE;                                     00002210
            DO J=K-1 TO 1 BY -1;                                     00002220
                IF NCODE(J) > NCODE(J+1) THEN DO;                    00002230
                                    TEMPCODE=NCODE(J+1);             00002240
                                    NCODE(J+1)=NCODE(J);             00002250
                                    NCODE(J)=TEMPCODE;               00002260
                                END;                                 00002270
                                ELSE GOTO NEXT;                      00002280
            END;    /* END OF J DO-LOOP     */                       00002290
        NEXT:                                                        00002300
        END;                                                         00002310
    END;            /* END OF K DO-LOOP */                           00002320
0   PGNO=PGNO+1;                                                     00002330
    OPGNO=PGNO;                                                      00002340
    WRITE FILE (REPORT) FROM (NEWPG);                                00002350
    WRITE FILE (REPORT) FROM (BLANK);                                00002360
    WRITE FILE (REPORT) FROM (TITLE1A);                              00002370
    WRITE FILE (REPORT) FROM (TITLE1B);                              00002380
    WRITE FILE (REPORT) FROM (TITLE2);                               00002390
    WRITE FILE (REPORT) FROM (TITLE3);                               00002400
    WRITE FILE (REPORT) FROM (TITLE4);                               00002410
    WRITE FILE (REPORT) FROM (TITLE_N);                              00002420
    WRITE FILE (REPORT) FROM (BLANK);                                00002430
    NOLINES=8;                                                       00002440
```

```
    OPEN FILE (NOTES);                                                  00002450
    READ FILE (NOTES) INTO (IN_NOTE);                                   00002460
0   DO K=1 TO LASTNOTE;                                                 00002470
        DO WHILE(TEMPNOTE -= NCODE(K));                                 00002480
            IF NCODE(K)<TEMPNOTE THEN DO;                               00002490
                ONOTE=NCODE(K);                                         00002500
                ONDESC=' DOES NOT EXIST ';                              00002510
                WRITE FILE (REPORT) FROM (NOTELINE);                    00002520
                WRITE FILE (REPORT) FROM (BLANK);                       00002530
                NOLINES=NOLINES+2;                                      00002540
                IF NOLINES>= 54 THEN GOTO GOT ;                         00002550
                GOTO AN_NOTE;                                           00002560
            END;                                                        00002570
            END_FILE_FLG='1'B;                                          00002580
            READ FILE (NOTES) INTO (IN_NOTE);                           00002590
        END;    /* END OF DO WHILE */                                   00002600
        END_FILE_FLG='0'B;                                              00002610
        ONOTE = TEMPNOTE;                                               00002620
        ONDESC = NDESC;                                                 00002630
        WRITE FILE (REPORT) FROM (NOTELINE);                            00002640
        NOLINES=NOLINES+1;                                              00002650
    GET_NOTE:                                                           00002660
        ONOTE=' ';                                                      00002670
        READ FILE (NOTES)INTO (IN_NOTE);                                00002680
        DO WHILE (NCODE(K) = TEMPNOTE);                                 00002690
            ONDESC=NDESC;                                               00002700
            WRITE FILE (REPORT) FROM (NOTELINE);                        00002710
            NOLINES=NOLINES+1;                                          00002720
            IF NOLINES>=54 THEN DO;                                     00002730
                    NEW_PG_FLG='1'B;                                    00002740
                    WRITE FILE (REPORT) FROM (BLANK);                   00002750
                    GO TO GOT;                                          00002760
            END;                                                        00002770
            READ FILE (NOTES) INTO (IN_NOTE);                           00002780
        END;    /* END OF DO WHILE */                                   00002790
        WRITE FILE (REPORT) FROM (BLANK);                               00002800
        NOLINES=NOLINES+1;                                              00002810
    GOT:                                                                00002820
        IF NOLINES >= 54 THEN DO;                                       00002830
            WRITE FILE (REPORT) FROM (DTLINE);                          00002840
            WRITE FILE (REPORT) FROM (NEWPG);                           00002850
            PGNO = PGNO+1;                                              00002860
            OPGNO=PGNO;                                                 00002870
            WRITE FILE (REPORT) FROM (BLANK);                           00002880
            WRITE FILE (REPORT) FROM (TITLE1A);                         00002890
            WRITE FILE (REPORT) FROM (TITLE1B);                         00002900
            WRITE FILE (REPORT) FROM (TITLE2);                          00002910
            WRITE FILE (REPORT) FROM (TITLE3);                          00002920
            WRITE FILE (REPORT) FROM (TITLE4);                          00002930
            WRITE FILE (REPORT) FROM (TITLE_N);                         00002940
            WRITE FILE (REPORT) FROM (BLANK);                           00002950
            NOLINES=8;                                                  00002960
            IF NEW_PG_FLG='1'B THEN DO;                                 00002970
                        NEW_PG_FLG='0'B;                                00002980
                        GO TO GET_NOTE;                                 00002990
            END;                                                        00003000
        END;    /* END OF IF THEN DO */                                 00003010
    AN_NOTE:                                                            00003020
    END;    /* END OF MAJOR K DO LOOP */                                00003030
    WRITE FILE (REPORT) FROM (DTLINE);                                  00003040
    GOTO OUT_REJ;                                                       00003050
    E_OF_NOTES:                                                         00003060
      IF END_FILE_FLG='0'B THEN J=K+1;                                  00003070
                      ELSE J=K;                                         00003080
      DO L = J TO LASTNOTE;                                             00003090
          WRITE FILE (REPORT) FROM (BLANK);                             00003100
          ONOTE = NCODE(L);                                             00003110
          ONDESC =' DOES NOT EXIST';                                    00003120
          WRITE FILE (REPORT) FROM (NOTELINE);                          00003130
      END;                                                              00003140
      WRITE FILE (REPORT) FROM (BLANK);                                 00003150
      WRITE FILE (REPORT) FROM (DTLINE);                                00003160
0   /****  OUTPUTS THE ITEM NUMBERS THAT WERE NOT IN THE CATALOG ***/   00003170
0 OUT_REJ:                                                              00003180
      CLOSE FILE (REJECT);                                              00003190
```

```
OPEN  FILE (REJECT) INPUT;                          00003200
WRITE FILE (REPORT) FROM (NEWPG);                   00003210
WRITE FILE (REPORT) FROM (TITLE1A);                 00003220
WRITE FILE (REPORT) FROM (TITLE1B);                 00003230
WRITE FILE (REPORT) FROM (TITLE2);                  00003240
WRITE FILE (REPORT) FROM (TITLE3);                  00003250
WRITE FILE (REPORT) FROM (BLANK);                   00003260
WRITE FILE (REPORT) FROM (TITLE_R);                 00003270
WRITE FILE (REPORT) FROM (BLANK);                   00003280
TRUE='1'B;                                          00003290
DO WHILE (TRUE);                                    00003300
     DO K=1 TO 8;                                   00003310
        READ FILE (REJECT) INTO (REJ_IT(K));        00003320
     END;                                           00003330
     WRITE FILE (REPORT)FROM (REJ_OUT);             00003340
  END;                                              00003350
E_OF_REJ:                                           00003360
   DO J=K TO 8;                                     00003370
      REJ_IT(J) = '';                               00003380
   END;                                             00003390
   WRITE FILE (REPORT) FROM (REJ_OUT);              00003400
   WRITE FILE (REPORT) FROM (BLANK);                00003410
   WRITE FILE (REPORT) FROM (DTLINE);               00003420
/****      END OF JOB    ****/                      00003430
E_OF_JOB:                                           00003440
 END CAPIM4D;                                       00003450
```

What is claimed is:

1. An off-line method of eliminating duplicate piping items associated with a pipe specification file of a computer-aided graphics system for generating a material ordering description report, said file containing unsorted piping items from a plurality of different piping classes but all of said piping items being associated with the same individual pipeline project, said system having two-dimensional pipeline coordinate axes, a planar axonometric representation of a three-dimensional pipeline in which material and non-material piping elements of said pipeline are associated with a multibit digital code representative of a series of workpoints compatible for use within a digital computer system, and workpoints including dominant and subservient points having known coordinates with respect to intersecting axes X, Y and Z, and being identified in relative three-dimensional coordinates by a distance (d) between points and values of angles of a straight line intersecting them as related to orthogonal planes of reference, comprising:

(A) inputting, off-line, said pipe specification file associated with said pipeline project both (i) as machine readable dara words or portions of words, and (ii) as a function of a piping classification index containing different classes of said piping items in a preselected data format, for operation within said system;

(B) scanning said inputted pipe specification file, class record-by-class record, to identify and then eliminate duplications, of said items of said file associated with said project irrespective of class origin; and (C) displaying said piping items of (B) in association with a stored code of catalog order descriptions of said items, to generate said material ordering description report whereby a general overview of the project is efficiently provided.

2. Method of claim 1 in which step (B) includes sorting said inputted piping information by piping class and by material item number, and then storing said material item numbers in a temporary file.

3. Method of claim 2 in which said sort step is done on a two-tier iterative basis.

4. Method of claim 2 with the additional substeps of (i) sorting said piping items stored in said temporary file on a basis of material item number of increasing or decreasing order, (ii) scanning said sorted items of (i) to eliminate duplications irrespective of class origin, and (iii) passing unduplicated piping items of (ii) on.

5. Method of claim 4 in which step (C) includes (i') cross-linking said unduplicated piping items with catalog order descriptions, and (ii') printing each item with its individual cross-linked catalog order description as said material ordering description report.

6. Method of claim 5 in which substep (i') includes linking all said piping items with all accumulated note references and in which substep (ii') includes printing accumulated note references, after all piping items have been indicated.

* * * * *